Figure 1:
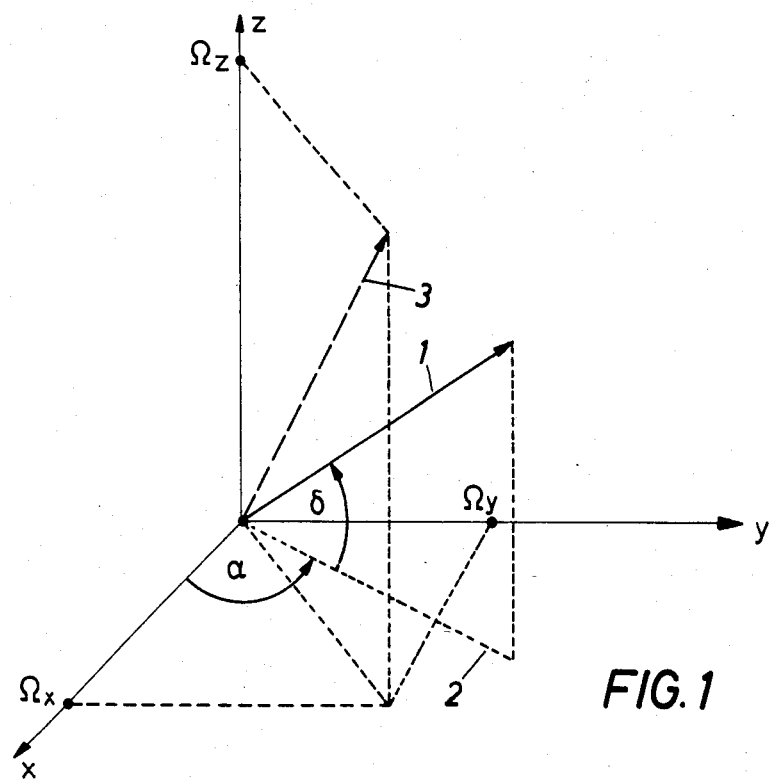

United States Patent [19]

Müller

[11] Patent Number: 4,643,574

[45] Date of Patent: Feb. 17, 1987

[54] METHOD FOR DETERMINING ANGULAR VELOCITY

[75] Inventor: Paul Müller, Heidelberg, Fed. Rep. of Germany

[73] Assignee: Teldix GmbH, Heidelberg, Fed. Rep. of Germany

[21] Appl. No.: 629,726

[22] PCT Filed: Nov. 5, 1983

[86] PCT No.: PCT/EP83/00291

§ 371 Date: Jul. 5, 1984

§ 102(e) Date: Jul. 5, 1984

[30] Foreign Application Priority Data

Nov. 20, 1982 [DE] Fed. Rep. of Germany ....... 3242914
Aug. 2, 1983 [DE] Fed. Rep. of Germany ....... 3327800

[51] Int. Cl.[4] ............................................. G01C 19/64
[52] U.S. Cl. ................................................... 356/350
[58] Field of Search .......................................... 356/350

[56] References Cited

U.S. PATENT DOCUMENTS 4,017,187 4/1977 Schwartz ............................ 356/350
4,243,324 1/1981 Friedland ........................... 356/350
4,407,583 10/1983 Simms ................................ 356/350

FOREIGN PATENT DOCUMENTS 1962136 12/1969 Fed. Rep. of Germany .

Primary Examiner—Vincent P. McGraw
Assistant Examiner—S. A. Turner
Attorney, Agent, or Firm—Spencer & Frank

[57] ABSTRACT

The application relates to a method for measuring the angular velocities about at least two mutually perpendicular axes.

For this purpose, a laser gyro, for example, is rotated about an auxiliary axis of rotation at the angular velocity $\omega_0$ and the output value of the gyro signal is determined when the gyro is in the rotary position $\omega_0 t$, at which one of the components of the output signal of the gyro becomes O. The components of the desired rotation can then be calculated from the resulting system of equations.

12 Claims, 4 Drawing Figures

METHOD FOR DETERMINING ANGULAR VELOCITY

The invention relates to a method for determining the angular velocities $\Omega_I$, $\Omega_{II}$ and/or $\Omega_{III}$ about at least two axes I, II and/or III of a preferably rectangular coordinate system. These axes may be, for example, the axles of a vehicle.

It is known to measure the angular velocities about two or even three axes that are perpendicular to one another by utilizing correspondingly placed gyros. Such a measuring arrangement is expensive.

It is the object of the invention to reduce the expenditures for measuring at least two angular velocities about mutually perpendicular axes.

This is accomplished in that a gyro (e.g. a laser gyro) which does not offer any resistance to rotation about any desired axis is rotated at a known angular velocity $\omega_o$ having the known components $\omega_{oI}$, $\omega_{oII}$ and $\omega_{oIII}$ about an auxiliary axis whose orientation in the coordinate system is defined by the angles $\phi$ and $\theta$, with $\phi$ being the angle between the first axis and the projection of this auxiliary axis of rotation in the plane defined by the first and second axis and $\theta$ is the angle between the auxiliary axis of rotation and this projection. The input axis of the gyro is inclined toward the auxiliary axis by an angle of $90[°]-\delta$ and the value for $\Omega$ is measured at angular values $\alpha = \omega_o t$, at which components of the term $\Omega = f[(\Omega_n + \omega_{on}, \text{ for } n=I \text{ through III}), (\phi), (\theta), (\delta), (\sin \omega_o t) \text{ and } (\cos \omega_o t)]$ representing the output signal $\Omega$ of the gyro become zero, with the values for $\Omega_I$, $\Omega_{II}$ and/or $\Omega_{III}$ being calculated from the resulting equations.

The following term results for the output signal $\Omega$ of the gyro:

$$\Omega = [(\Omega_I + \omega_{oI})\cos\phi + (\Omega_{II} + \omega_{oII}) \cdot \sin\phi]\cos\delta\cos\omega_o t + \quad (1)$$

$$[-(\Omega_I + \omega_{oI}) \cdot \sin\phi\cos\theta + (\Omega_{II} + \omega_{oII}) \cdot \cos\phi\cos\theta +$$

$$(\Omega_{III} + \omega_{oIII}) \cdot \sin\theta] \cdot \cos\delta\sin\omega_o t +$$

$$[(\Omega_I + \omega_{oI})\sin\phi\sin\theta - (\Omega_{II} + \omega_{oII}) \cdot \cos\phi\sin\theta +$$

$$(\Omega_{III} + \omega_{oIII}) \cdot \cos\theta]\sin\delta$$

Pursuant to the first feature of the solution according to the invention, a gyro is employed which does not offer any resistance to the required rotation; a mechanical gyro cannot be used here. The above stated teaching permits the determination of only two or also three angular velocities $\Omega_I$, $\Omega_{II}$ and/or $\Omega_{III}$. To simplify the calculation, the auxiliary axis of rotation is placed advantageously into one axis, e.g. into the third axis; then there will be no components of $\omega_o$ about the other axes. Since $\phi$ and $\theta$ are zero, Equation (1) above is simplified to:

$$\Omega = \Omega_I \cos \delta \cos \omega_o t + \Omega_{II} \cos \delta \sin \omega_o t + (\Omega_{III} + \omega_{oIII}) \sin \delta \quad (2)$$

It can be seen that with this arrangement it is possible to determine all three components $\Omega_I$ to $\Omega_{III}$ by measuring $\Omega$ at $\cos \omega_o t_1 = 0$ and $\sin \omega_o t_2 = 0$ and a third value of $\omega_I (\omega_o t_3)$, at which the sine or cosine of $\omega t_3$ becomes 0. $\delta$ is constant. If $\delta$ is made to equal zero, the last term can be omitted and $\omega_I$ and $\omega_{II}$ can be determined by measuring $\Omega$ at two angles $\alpha$ which differ by 90° (or an odd multiple thereof).

Preferably, the angular velocity $\omega_o$ is selected at such magnitude that it is greater than the greatest possible angular velocities to be determined. Only then is it assured that the $\Omega$ values determined successively at various angles of $\alpha$ or possibly $\delta$ originate from the same angular velocity.

Thus, $\omega_o$ will be selected depending on the case at hand. For use on ships, there will occur practically no angular velocities $\Omega$ greater than a few radians/sec. In this case, a value of, e.g., 10 revolutions per second is sufficient for $\omega_o$. For use in land vehicles, a greater $\omega_o$ will have to be selected, e.g. 30 to 100 revolutions per second.

Although it is actually sufficient to swing the gyro back and forth over only a sufficient angular range at $\omega_o$, continuous rotation will generally be preferred. If $\omega_o$ is constant over the entire range of rotation, the components resulting therefrom can also be calculated and are constant. If necessary, $\omega_o$ must also be measured by measuring the time required for one revolution. If $\omega_o$ is not constant within the individual revolution, the curve of $\omega_o$ during the revolution must be determined, e.g. by measuring the times at which a plurality of angle markers are reached (e.g. every 30°) and the actual values for the components of $\omega_o$ must be determined from the resulting curve at the corresponding angles $\alpha_n$ and possibly $\delta_n$.

In a modification of the invention it is proposed to arrange the auxiliary axis of rotation in space in such a manner that it forms the same angles with respect to the x, y and z coordinates of the coordinate system.

If these angles are each 54.73°, the auxiliary axis of rotation becomes the axis of rotation or the center axis, respectively, of a cone whose generatrix is identical at three points with the coordinate axes.

In a preferred modification of the invention it is proposed to orient the input axis of the gyro parallel with the generatrix of the cone. In this case, the angular velocity about one of the coordinate axes can be measured directly if there is a momentary coincidence of the input axis with that coordinate axis.

One embodiment of the invention will be explained with the aid of the drawing.

Figure 2:
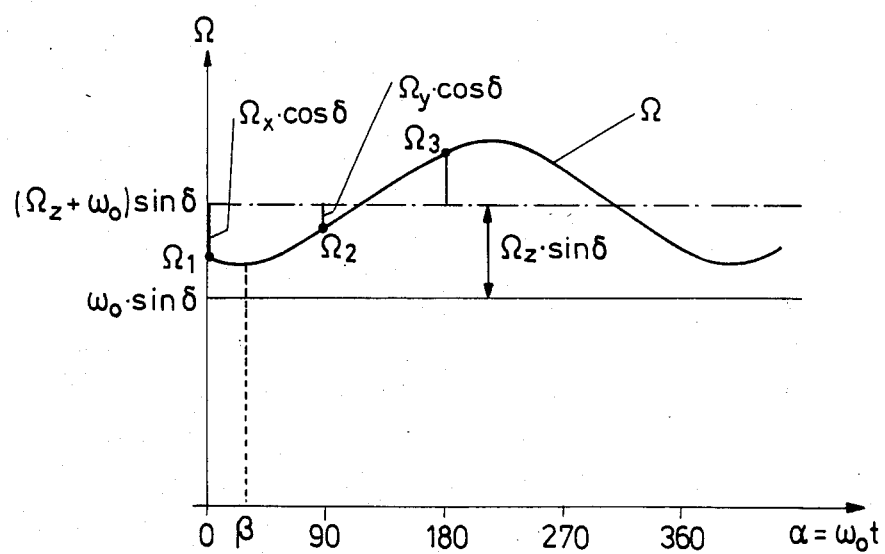
Figure 3:
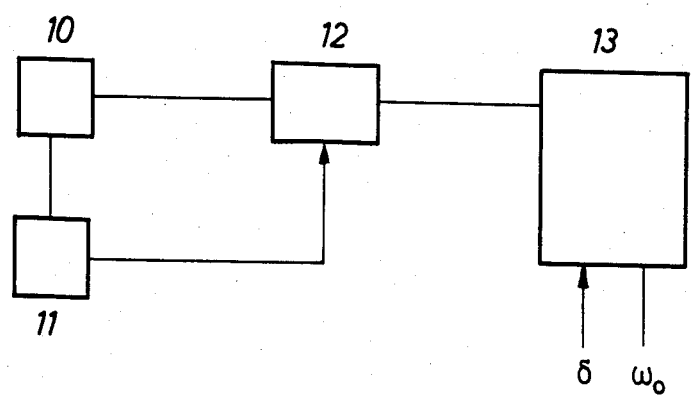
Figure 4:
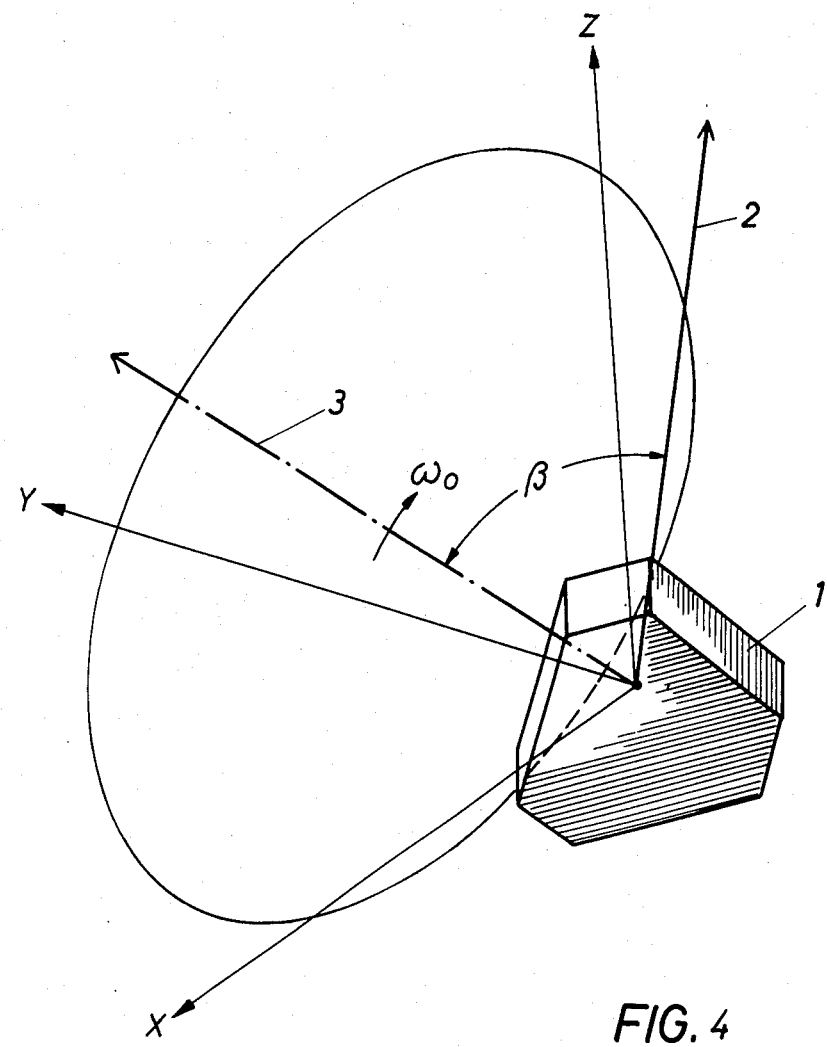

It is shown in:

FIG. 1, an embodiment in which the gyro is rotated about the z axis at $\omega_o$;

FIG. 2, the curve of $\Omega$ resulting therefrom;

FIG. 3, a block circuit diagram for determining the components of $\Omega$;

FIG. 4, an embodiment in which the gyro rotates on a cone generatrix which is tangent on the x, y, [and] z coordinates.

In FIG. 1, a laser gyro is placed in the zero point of an x, y, z coordinate system. This gyro has an input axis 1 whose momentary position is given by the angles $\alpha = \omega_o t$ between the x axis and projection 2 of axis 1 on the x-y plane and the angle $\delta$ between projection 2 and axis 1. The gyro is rotated about the z axis at a constant and known angular velocity $\omega_o$. Thus, axis 1 describes a cone generatrix about the z axis. A random angular velocity which is to be determined with respect to its components $\Omega_x$, $\Omega_y$ and $\Omega_z$ about any desired axis 3 is superposed on the rotation about the z axis at $\omega_o$.

Under these conditions, the above stated equation (2) applies. Plotted over the angle $\alpha = \omega_o t$ which changes due to the rotation about the z axis, the output signal $\Omega$ of the gyro will have the curve shown in FIG. 2, i.e. it oscillates about the value $(\Omega_z+\omega_o)\sin\delta$ which results from the last term of (2) and is dependent on $\Omega_z$, but constant over $\alpha$. By determining the values $\Omega_1$ at $\alpha_1=0°$, $\Omega_2$ at $\alpha_2=90°$, and $\Omega_3$ at $\alpha_3=180°$, the following equation system results:

$$\Omega_1 = \Omega_x\cos\delta + (\Omega_z + \omega_o)\sin\delta \quad (3)$$

$$\Omega_2 = \Omega_y\cos\delta + (\Omega_z + \omega_o)\sin\delta$$

$$\Omega_3 = -\Omega_x\cos\delta + (\Omega_z + \omega_o)\sin\delta$$

The solution of these equations provides the unknown values $\Omega_x$, $\Omega_y$ and $\Omega_z$ as follows:

$$\Omega_x = \frac{\Omega_1 - \Omega_3}{2\cos\delta} \quad (4)$$

$$\Omega_y = \frac{2\Omega_2 - \Omega_1 - \Omega_3}{2\cos\delta}$$

$$\Omega_z = \frac{\Omega_1 + \Omega_3}{2\sin\delta} - \omega_o$$

In FIG. 3, the gyro is marked 10, a sensor which monitors the rotation of gyro 10 and puts out a trigger signal at $\alpha_1$, $\alpha_2$ and $\alpha_3$ is marked 11, a gate is marked 12 and a computer is marked 13. As soon as the angle values $\alpha_1$ to $\alpha_3$ are reached, sensor 11 sends trigger signals to gate 12 so that the output signals $\Omega_1$, $\Omega_2$ and $\Omega_3$ present at the gyro at this time reach computer 13 which solves Equation (4) under consideration of the constants $\omega_o$ and $\delta$.

If $\delta=0$, the following equations result from (3):
$\Omega_x=\Omega_1$ at $\alpha=0°$ and
$\Omega_y=\Omega_2$ at $\alpha=90°$.
Thus, in this case, $\Omega_x$ and $\Omega_y$ are two components which are determined particularly easily.

With the use of a laser gyro, the method according to the invention has the particular advantage that an output signal $\Omega$ of the gyro appears (e.g. $\omega_{oIII}\sin\theta$ (in case 2)) before a measurable rotation having components $\Omega_I$, $\Omega_{II}$ and/or $\Omega_{III}$ is present. This phenomenon results in a displacement of the 0 point of the laser gyro: this phenomenon thus brings about the "side effect" of lock-in suppression, i.e. the avoidance of the inability of the gyro to measure at low rates of rotation. In this case, $\delta$ must be selected in such a manner that with a given $\omega_o$ the zero point will be displaced sufficiently far into one branch of the operating characteristic of the gyro.

If $\delta$ is permitted to become $=90°$, a laser gyro results which measures only rotation about one axis but likewise exhibits lock-in suppression (e.g. $\Omega=\Omega_{III}+\Omega_{oIII}$ for (2)). This is also a realization which is significant for the invention and which can be used if individual gyros are employed.

FIG. 4 shows a laser gyro 1 and its input axis 2. This laser gyro is rotated at a constant speed $\omega_o$ about axis of rotation 3. Input axis 2 is inclined by an angle $\beta=54.73°$ with respect to the axis of rotation. This value results from the equation $$\cos^2\beta_1+\cos^2\beta_2+\cos^2\beta_3=1$$

where $\beta_1=\beta_2=\beta_3$. Thus axis 2 describes a cone generatrix and, in three positions shifted by 120° with respect to one another, lies parallel to the reactangularly abutting coordinates x, y and z of any desired coordinate system. Preferably, this coordinate system is identical with the coordinate system in which the vector of an angular velocity is to be determined. This eliminates coordinate transformation and the angular velocity component $\Omega$ of the vector on axes x, y and z, can be determined directly by measuring the angular velocities $\Omega_{I, II, III}$ about input axis 2 of the gyro in three positions identical with coordinates x, y and z, according to the equation:

$$\Omega_x=\Omega_I+\omega_o\cos\beta$$

$$\Omega_y=\Omega_{II}+\Omega_o\cos\beta$$

$$\Omega_z=\Omega_{III}+\omega_o\cos\beta$$

in which the component of rotation $\omega_o$ about axis 3 is considered.

When employing a laser gyro, the method according to the invention has the particular advantage that an output signal of the gyro appears before a measurable rotation having the components $\Omega_I$, $\Omega_{II}$ and/or $\Omega_{III}$ is present. This phenomenon results in a shift of the zero point of the laser gyro, thus it brings about the "side effect" of lock-in suppression, i.e. avoidance of the inability of the gyro to measure at low rates of rotation. In this case, $\omega_o$ must be selected in such a manner that the zero point will be displaced sufficiently far into one branch of the operating characteristic of the gyro.

I claim:

1. Method for determining the angular velocities $\Omega_I$, $\Omega_{II}$ and/or $\Omega_{III}$ about at least two axes I, II and/or III of a preferably rectangular coordinate system, characterized in that a gyro which does not resist rotation about any desired axis (e.g. a laser gyro) having a known angular velocity $\omega_o$ with the known components $\omega_{oI}$, $\omega_{oII}$ and $\omega_{oIII}$ is rotated about an auxiliary axis of rotation whose orientation in the coordinate system is defined by the angles $\phi$ and $\theta$, where $\phi$ is the angle between the first axis and the projection of said auxiliary axis of rotation in the plane defined by the first and the second axis and $\theta$ is the angle between the auxiliary axis of rotation and this projection, with the input axis of the gyro being inclined with respect to the auxiliary axis of rotation by an angle of $90-\delta$; that the value for $\Omega$ is measured at angle values $\alpha=\omega_o t$, at which components of the term $\Omega=f_{[(\Omega_n+\omega_{on}, \text{ for } n=I \text{ through III}), (\phi), (\theta), (\delta), (\sin\omega t) \text{ and } (\cos\omega t)]}$ representing the output signal $\Omega$ of the gyro become zero and the values for $\Omega_I$, $\Omega_{II}$ and/or $\Omega_{III}$ are calculated from the resulting equations.

2. Method according to claim 1, characterized in that the auxiliary axis of rotation is placed into one of the axes I, II or III.

3. Method according to claim 1, characterized in that the auxiliary axis of rotation is placed into axis III.

4. Method according to claim 3, characterized in that the angle $\delta$ is selected to be zero.

5. Method according to claim 1 characterized in that the angular velocity $\omega_o$ is greater than the highest occurring angular velocity $\Omega$.

6. Method according to claim 1, characterized in that the angular velocity $\omega_o$ is kept constant.

7. Method according to claim 1, characterized in that the respective angular velocity is measured.

8. Method according to claim 7, characterized in that the curve of the angular velocity is determined over the range of the angle of rotation and is utilized for the exact determination of $\omega_o$ at the angles $\alpha_n$, at which $\Omega_n$ is determined.

9. Method according to claim 1, characterized in that the auxiliary axis of rotation is oriented in such a manner that the angles $\beta_1$, $\beta_2$ and $\beta_3$ formed between the auxiliary axis of rotation and the coordinate axis of the coordinate system are identical in size.

10. Method according to claim 9, characterized in that the angles $\beta_{1-3}=54.73°$ and the input axis of the gyro is likewise inclined by 54.73° with respect to the auxiliary axis of rotation, so that, if the gyro rotates about the auxiliary axis of rotation, the input axis lies parallel to the coordinate axes x, y and z in three momentary positions.

11. Method according to claim 10, characterized in that the output signal $\Omega$ of the gyro in the three positions I, II, III is formed according to the equations $$\Omega_I = \Omega_x + \omega_o \cos \beta_1$$

$$\Omega_{II} = \Omega_y + \omega_o \cos \beta_2$$

$$\Omega_{III} = \Omega_z + \omega_o \cos \beta_3$$

where the angular velocities about axes x, y and z are marked $\Omega_{x, y, z}$.

12. Method according to claim 1, characterized in that only a single gyro is rotated about the auxiliary axis and the values for $\Omega_I$, $\Omega_{II}$ and/or $\Omega_{III}$ are calculated on the basis of the output signal $\Omega$ produced by the single gyro.

* * * * *